United States Patent [19]

Tada et al.

[11] Patent Number: 5,700,215
[45] Date of Patent: Dec. 23, 1997

[54] HYDRAULIC TENSIONER WITH PISTON RETENTION STOP

[75] Inventors: Naosumi Tada; Naoji Sakamoto, both of Nabari, Japan

[73] Assignee: Borg-Warner Automotive, K.K., Nabari, Japan

[21] Appl. No.: 675,389

[22] Filed: Jul. 2, 1996

[30] Foreign Application Priority Data

Aug. 11, 1995 [JP] Japan .................................. 7-227263

[51] Int. Cl.⁶ ...................................................... F16H 7/08
[52] U.S. Cl. ............................ 474/110; 474/111; 474/138
[58] Field of Search ................................. 474/101, 104, 474/110, 111, 138

[56] References Cited

U.S. PATENT DOCUMENTS 4,772,251  9/1988  Goppelt et al. .
4,792,322 12/1988  Goppelt et al. .
4,863,417  9/1989  Kimata et al. ..................... 474/111 X
4,911,680  3/1990  Kodama et al. .
4,940,447  7/1990  Kawashima et al. .
4,985,009  1/1991  Schmidt et al. .
5,601,505  2/1997  Tada .................................... 474/110

FOREIGN PATENT DOCUMENTS 58-38189  8/1983  Japan .
3-35355   4/1991  Japan .

*Primary Examiner*—Roger J. Schoeppel
*Attorney, Agent, or Firm*—Sidley & Austin; Greg Dziegielewski

[57] ABSTRACT

A hydraulic tensioner having a slidable plunger in a housing, a shaft stopper ring on the rear-end of the plunger, and a stopper screw fastened to the housing that can engage with the shaft stopper ring at the retracted position of the plunger. Packing is provided to seal a clearance between the stopper screw and the housing when the stopper screw is in its engagement position with the housing.

4 Claims, 5 Drawing Sheets

HYDRAULIC TENSIONER WITH PISTON RETENTION STOP

BACKGROUND OF THE INVENTION

This invention relates to a hydraulic tensioner for applying proper tension force to a chain or belt. More particularly, it relates to a tensioner having an engagement structure which can hold the plunger in its retracted position.

Conventionally, a hydraulic tensioner is used to suppress flapping, noise, and vibration of a chain or belt due to engine torque fluctuations.

Generally, a hydraulic tensioner has a housing with an opening on one end, a plunger which can be freely retracted in or extended from the said opening, and a spring that constantly pushes the plunger toward the protruding position. The plunger contacts the tensioner arm located on the slack side of a chain or belt. In addition, an oil chamber is formed by the housing opening and plunger rear-end, and external oil pressure acts in said oil chamber.

When the hydraulic tensioner is attached to the engine, the plunger comes into constant contact with the chain. Therefore, the hydraulic tensioner must be removed from the engine for maintenance work, such as the replacement of the chain, cam shaft, or sprocket.

On the other hand, a hydraulic tensioner with an engagement member that can retain the plunger in its retracted position prior to the attachment will make the attachment of the hydraulic tensioner to the engine easier. Here, said engagement member can be used to retain the plunger in its retracted position during maintenance work without removal of the hydraulic tensioner form the engine.

In this case, a worker needs to push the plunger tip against a spring force to get the plunger into the housing. However, incompressible oil is in the oil chamber of the housing during maintenance work, so it is difficult to push the plunger into the housing.

The present invention addresses such problems and offers a hydraulic tensioner that does not need to be removed from the engine, makes moving the plunger to its retracted position easier, and as a result, makes the maintenance easier.

SUMMARY OF THE INVENTION

The present invention provides a hydraulic tensioner with a housing having an internal fluid chamber. A plunger is energized by an energizing means, such as a spring, and biased toward the protruding direction of the tensioner while being inserted in the fluid chamber opening. There is an engagement part at the rear-end of the plunger. A stopper screw can engage with the engagement part when the plunger rear-end enters into said oil chamber in the plunger retraction position. The stopper screw is screwed into said housing. At the same time, a sealing member seals a clearance between said stopper screw and said housing when the stopper screw is fastened onto the housing.

In one example of the hydraulic tensioner, there is a shaft stopper ring as the engagement part. In a second example, the engagement part is a female thread formed on the rear-end face of the plunger. Finally, in a third example, an engagement part is provided at the end of the stopper screw where a tool can be used to turn the said stopper screw to engage.

During maintenance work on the hydraulic tensioner of this invention, first, the stopper screw is loosened, and a clearance is opened between the stopper screw and the housing. In this situation, the plunger is pushed into the housing against the energizing force of an energizing means. At this time, the oil chamber is connected to the outside via the said clearance. As a result, oil in the oil chamber leaks through the clearance as the plunger is pushed into the housing. This causes easy movement of the plunger to its retracted position.

Next, the stopper screw is turned and engaged with the engagement part at the rear-end of the plunger. The plunger is retained in its retracted position while maintenance operations are conducted. In this case, maintenance can be performed without the removal of the hydraulic tensioner from the engine, and the plunger can be retracted easily prior to the maintenance operations. Thus, maintenance is easier.

When the maintenance work is completed, the stopper screw is turned, and its engagement with the plunger is released. Then, the plunger protrudes by the pressure force of the energizing means and contacts the tensioner arm. The stopper screw is turned to its fastened position. At this time, a sealing member seals the clearance between the stopper screw and the housing. Similar to the premaintenance work condition, the oil chamber is sealed.

In the first practical mode of this invention, the shaft stopper ring is used as the engagement part in the hydraulic tensioner. Therefore, the stopper screw can be stopped easily, even when the plunger rotates.

In the second practical mode, where a female thread formed on the rear-end face of the plunger is the engagement part, the stopper screw is engaged into this female thread during maintenance work. Thus, retention of the plunger in its retracted position is secured.

Also, where an engagement part for tool engagement is provided at the end of the stopper screw in the hydraulic tensioner, the tool is engaged to this engagement part to turn the stopper screw. The stopper screw is fastened securely to the housing when the stopper screw is put in an engagement position.

DETAILED DESCRIPTION OF THE PREFERRED EMBODIMENTS

Figure 1:
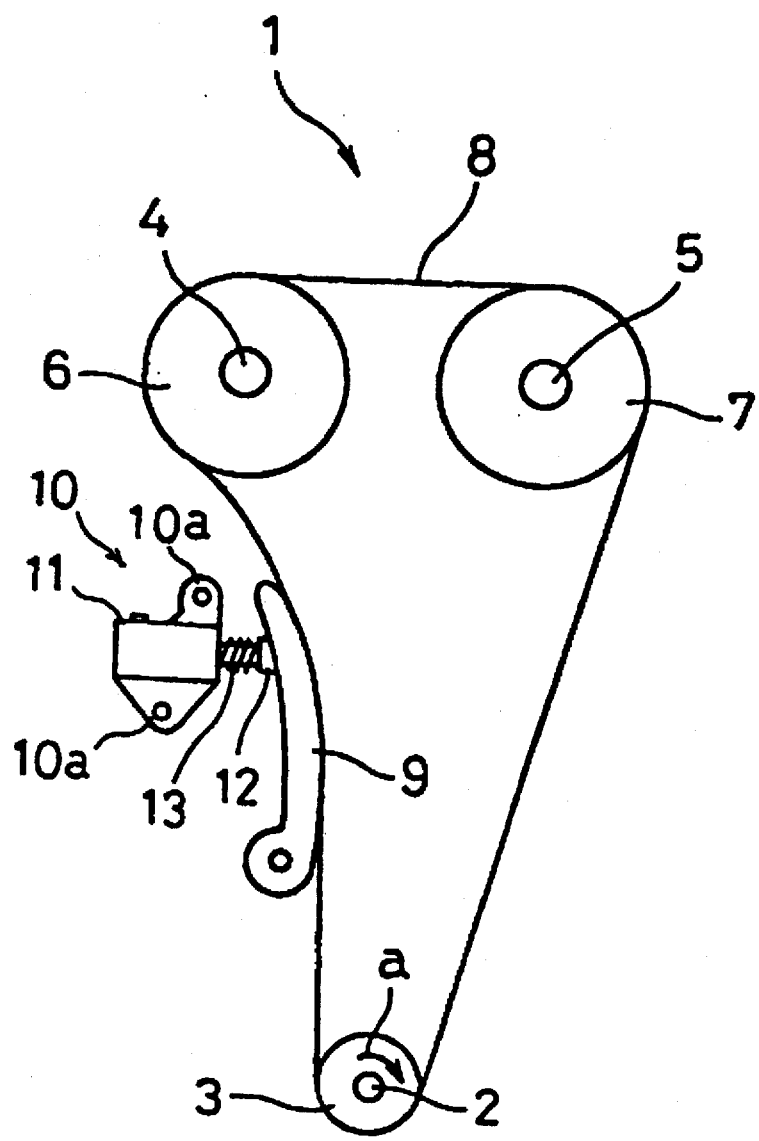
FIG. 1 is a front view of one example of an engine timing system in which the hydraulic tensioner of a practical mode of this invention is used.
Figure 2:
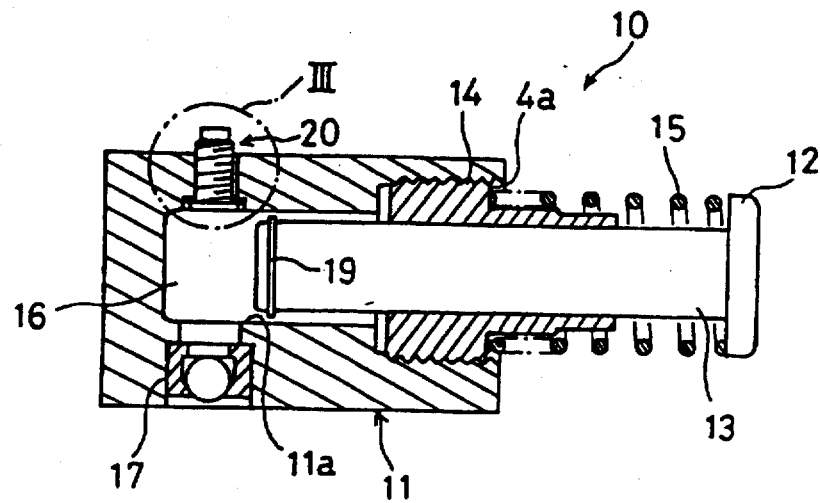
FIG. 2 is a front cross-sectional view of the main part of the hydraulic tensioner.
Figure 3:
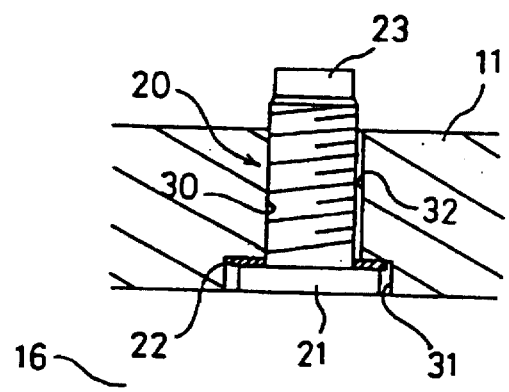
FIG. 3 is an enlargement of the stopper screw of the hydraulic tensioner.
Figure 4:
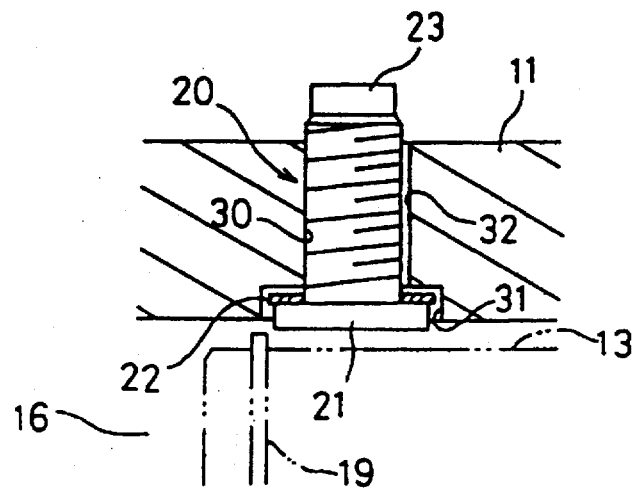
FIG. 4 illustrates the plunger in the retracted position.
Figure 5:
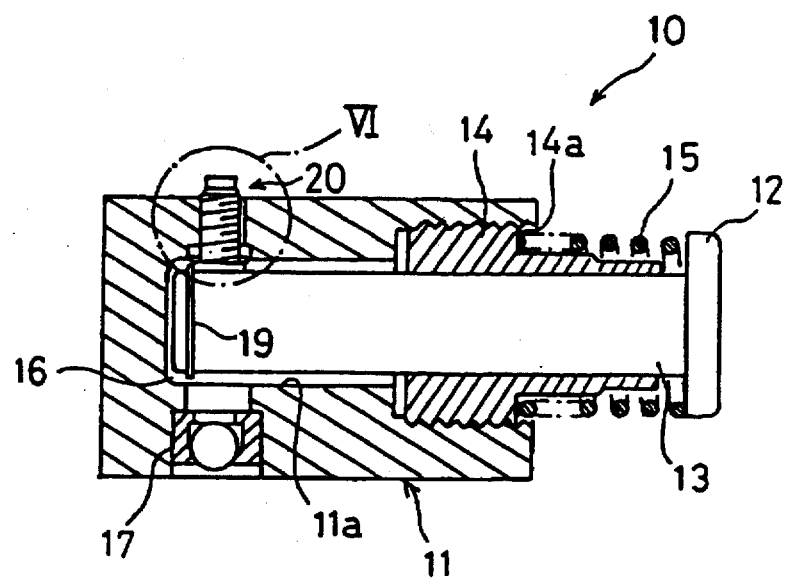
FIG. 5 illustrates the stopper screw maintaining the plunger in the retracted position.
Figure 6:
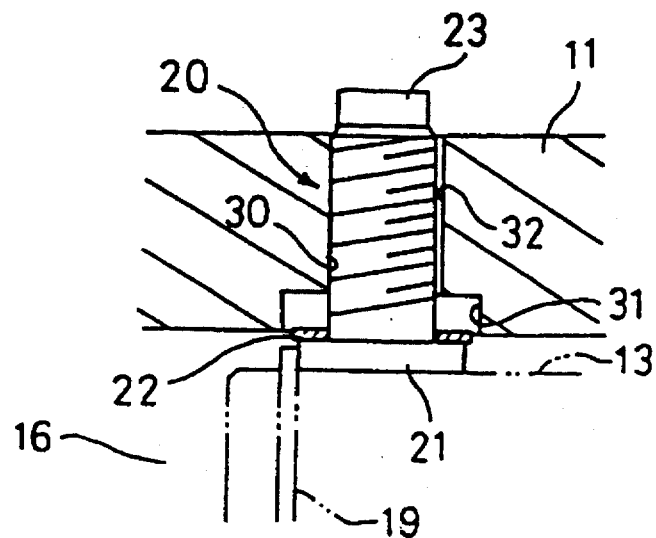
FIG. 6 illustrates the engagement of the stopper screw with the shaft stopper ring at the rear end of the plunger.

FIGS. 1 to 6 illustrate the hydraulic tensioner of a practical mode of this invention, where FIG. 1 is a front view of an example of an engine timing system in which a hydraulic tensioner is used. FIG. 2 is a front cross-section of the main part of the hydraulic tensioner. FIG. 3 is an enlargement of the stopper screw. FIGS. 4 to 6 illustrate the steps during maintenance work.

FIG. 1 shows the DOHC engine-timing system 1, where drive sprocket 3 is fixed onto crankshaft 2, driven sprockets 6 and 7 are fixed into two camshafts 4 and 5, respectively, and timing chain 8 is placed across these sprockets. Incidentally, arrow a in the figure indicates the direction of rotation of crankshaft 2.

Hydraulic tensioner 10 is located on the slack side of timing chain 8 to apply tensioning force to timing chain 8 via tensioner arm 9.

As shown in FIG. 2, hydraulic tensioner 10 has housing 11 in which hole 11a, having an opening at one end, is formed. Plunger 13 is inserted into hole 11a, support part 14 supports plunger 13 slidably, and coil spring 15 constantly presses plunger 13 toward the direction of protrusion. One end of coil spring 15 and its other end are in pressure contact with the end face of contact part 12 and the end face 14a of support part 14, respectively.

Although they are omitted in FIG. 2, leg parts 10a, having a bolt insertion hole for bolt-fastening of hydraulic tensioner 10 onto the engine cylinder block, are provided at the top and bottom of housing 11 (see FIG. 1).

Oil chamber 16 is formed in hole 11a by the inner wall of hole 11a in housing 11, the rear and outer peripheral surfaces of plunger 13, and the end side of support member 14. In oil chamber 16, the oil pressure from the external hydraulic circuit (not shown), including an oil pump, is supplied by check valve 17 located at the bottom of housing 11.

Shaft stopper ring 19 is attached as the engagement part to the rear end of plunger 13. Also, stopper screw 20 is provided at a position opposite of check valve 17 on top of housing 11.

As shown in FIG. 3, stopper screw 20 is screwed into female thread 30 that runs through housing 11 from the top to the bottom with its head part 21 at the bottom. Counter-sink part 31 is formed at the bottom opening of female thread 30. Head 21 of stopper screw 20 is inside counter-sink part 31 when stopper screw 20 is in its fastened position in female thread 30.

Packing 22 is attached to the stopper screw as the sealing member and said packing 22 is pinched between head 21 of stopper screw 20 and counter-sink part 31 when stopper screw 20 is in its fastened position.

Oil release groove 32, for releasing oil in oil chamber 16 during maintenance work, is formed in a part of female thread 30. Also, at the top end of stopper screw 20, engagement part 23 for engagement of a tool to turn the said stopper screw is provided. This engagement part 23 can be, for example, screw driven grooves, i.e., a straight or crossed groove or a hexagonal hole or head for spanner engagement.

Next, the steps of the maintenance work are explained. First, stopper screw 20 is slightly loosened (see FIG. 4) to provide a clearance between stopper screw 20 and housing 11. At this time, oil chamber 16 in housing 11 is linked to an external space through the clearance between stopper screw 20 and female thread 30 and oil release groove 32.

In this situation, plunger 13 is pushed into housing 11 against the spring force of coil spring 15. As plunger 13 is pushed into housing 11, oil in oil chamber 16 leaks to the outside via the said clearance and oil release groove 32. Thereby, plunger 13 can be moved easily to its retracted position (shown by the double-dotted line in FIG. 4).

Then, stopper screw 20 is loosened further and head 21 of stopper screw 20 is engaged with shaft stopper ring 19 at the rear-end of the plunger (see FIGS. 5 and 6). Plunger 13 is retained in its retracted position, and a clearance is formed between contact part 12 at the plunger tip and tensioner arm 9. Hence, the maintenance work is performed in this situation.

In this case, the maintenance work can be performed without the removal of hydraulic tensioner 10 from the engine, and at the same time, plunger 13 can be easily moved to its retracted position prior to the maintenance work. As a result, the maintenance work becomes easier.

In addition, shaft stopper ring 19 is used as the engagement part in this case. Therefore, stopper screw 20 can be easily engaged even when plunger 13 is rotated.

When the maintenance work is completed, stopper screw 20 is turned to fasten and engage head 21 of stopper screw 20, and shaft stopper ring 19 at the rear end of the plunger is released (see FIG. 4). Due to the spring force of coil spring 15, plunger 13 protrudes and comes into contact with tensioner arm 9.

Next, stopper screw 20 is further fastened so that stopper screw 20 reaches the fastened position with female thread 30 (see FIGS. 2 and 3). At this time, packing 22 is pinched between head 21 of stopper screw 20 and counter-sink part 31; therefore, the clearance between stopper screw 20 and housing 11 is sealed. Similarly, oil chamber 16 is sealed in its premaintenance sealed condition.

Also, at this time, stopper screw 20 is turned by a tool so that stopper screw 20 is fastened securely to female thread 30.

In the said practical mode, stopping by stopper screw 20 and shaft stopper ring 19 was shown, but this invention is not limited to that application. For example, a pin can be put on the outer peripheral surface of the plunger rear-end instead of shaft stopper ring 19, and a stopper hole for stopping of the said pin can be formed in head 21 of stopper screw 20.

Additionally, a pin can be put at the center of head 21 of stopper screw 20, and a groove for stopping the said pin can be formed on the outer peripheral surface of the plunger rear-end. Also, an O-ring can be used instead of packing 22.

Figure 7:
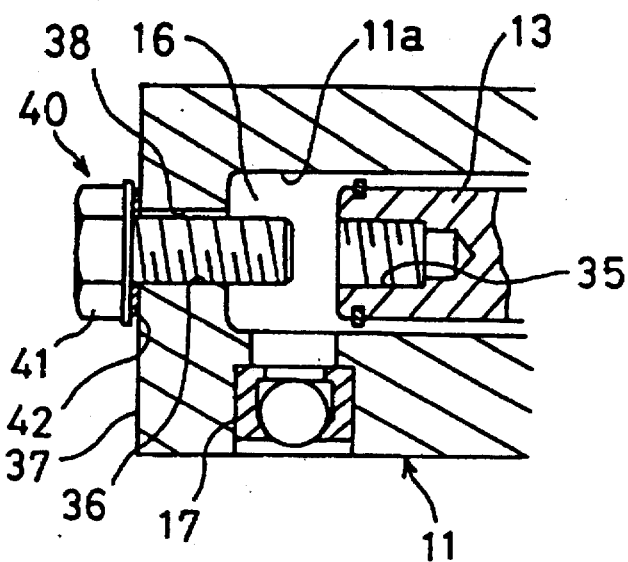
FIG. 7 is a front partial cross-section of the hydraulic tensioner of another practical mode of this invention.

FIG. 7 shows a part of the hydraulic tensioner of another mode of this invention. In the figure, the same numbers as in the above practical mode indicate corresponding parts in these figures. Here, female thread 35 is formed on the rear-end face of plunger 13 as an engagement part.

Female thread 36 that penetrates housing 11 axially is formed on the side wall of housing 11. Flange bolt 40 is screwed into female thread 36. Alternatively, flange bolt 40 can be screwed into female thread 35 of plunger 13.

Also, packing 42, as the sealing member, is attached onto flange belt 40. Packing 42 is pinched between head 41 of flange bolt 40 and side face 37 of the housing when flange bolt 40 is at its fastened position (see FIG. 7).

Oil release groove 38, which releases oil in oil chamber 16 to the outside during maintenance work, is formed in a part of female thread 36.

Next, the steps of maintenance work in this practical mode are explained. First, flange bolt 40 is loosened (see FIG. 8) to provide a clearance between flange bolt 40 and housing 11. Thereby, oil chamber 16 in housing 11 is linked to an external space through the clearance between flange bolt 40 and female thread 36 and oil release groove 38.

In this situation, plunger 13 is pushed into housing 11 against the spring force of a coil spring. Then, the oil in oil chamber 16 leaks to the outside via the said clearance and oil release groove 38. As a result, plunger 13 can be easily moved to its retracted position (see solid line of FIG. 9).

Figure 9:
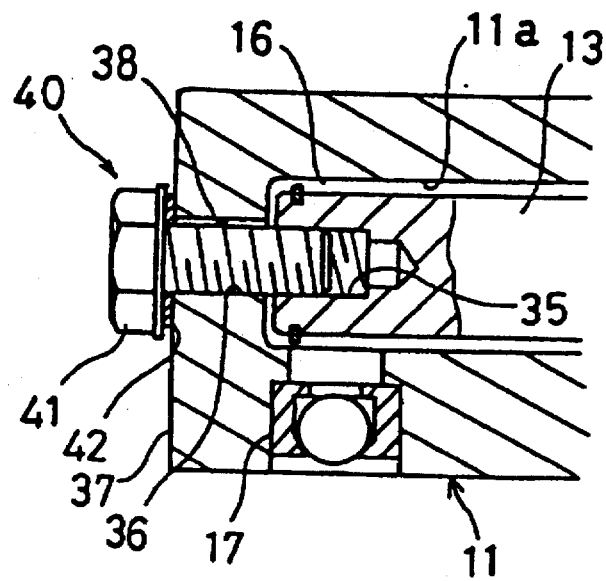
FIG. 9 illustrates the plunger in the retracted position for the other practical mode.

Subsequently, flange bolt 40 is fastened and the thread part of flange bolt 40 is screwed into female thread 35 on the rear-end facet of the plunger (see FIG. 9). Thereby, plunger 13 is retained in its retracted position. Maintenance work is performed in this situation.

Similarly to the above practical mode, maintenance can be performed with the removal of the hydraulic tensioner from the engine in this case, and at the same time, plunger 13 can be easily moved to its retracted position prior to the maintenance work. Thus, the maintenance work becomes easier.

In addition, flange bolt 40 is screwed into female thread 35 formed on the rear-end facet of the plunger. Therefore, plunger 13 is securely retained in its retracted position.

Figure 8:
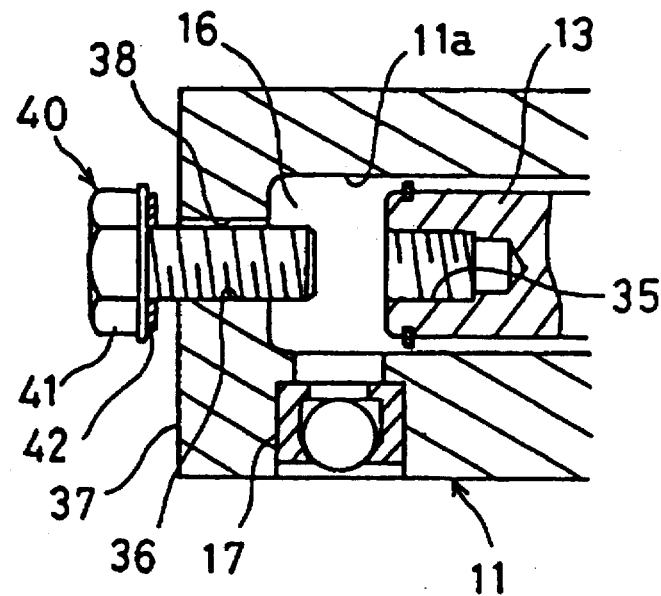
FIG. 8 illustrates the flange bolt loosened to the opening of the clearance between the flange bolt and housing for the other practical mode.

When the maintenance work is completed, flange bolt 40 is loosened, and the engagement of flange bolt 40 and female thread 35 is released (see FIG. 8). Then, plunger 13 protrudes because of the spring force of the coil spring and contacts the tensioner arm.

Next, flange bolt 40 is tightened to the engagement position of flange bolt 40 with female thread 35 of housing 11 (see FIG. 7). At this time, packing 42 is pinched between head 41 of flange bolt 40 and housing side face 37, so the clearance between flange bolt 40 and housing 11 is sealed. Thereby, oil chamber 16 can be sealed similarly to the premaintenance condition.

Incidentally, engagement structures using stopper screw 20, shaft stopper ring 19, flange bolt 40 and female thread 35 of the above practical modes can be used for retention of the plunger in its retracted position prior to assembly of the hydraulic tensioner to the engine. In this case, the steps taken are the same as mentioned before; therefore, the explanation is omitted.

What is claimed is:

1. A hydraulic tensioner comprising:

a housing having an oil chamber formed in a bore in said housing;

a plunger inserted in said oil chamber and biased by a spring toward the protruding direction of said housing;

an engagement part located at the rear-end of said plunger;

a stopper screw for engagement with said engagement part when said plunger is retracted into said oil chamber in the plunger retraction position, said stopper screw being fastened to said housing;

a sealing member for sealing a clearance between said stopper screw and said housing when the stopper screw is fastened onto said housing.

2. The hydraulic tensioner of claim 1 wherein said engagement part is a shaft stopper ring.

3. The hydraulic tensioner of claim 1 wherein said engagement part is a female thread part formed on the rear-end face of said plunger.

4. The hydraulic tensioner of claim 1 wherein said stopper screw includes an engagement part on its end portion with which a tool can turn to engage.

* * * * *